US 8,730,296 B2

(12) United States Patent
Zhan et al.

(10) Patent No.: US 8,730,296 B2
(45) Date of Patent: May 20, 2014

(54) METHOD, DEVICE, AND SYSTEM FOR VIDEO COMMUNICATION

(75) Inventors: Wuzhou Zhan, Shenzhen (CN); Dongqi Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 282 days.

(21) Appl. No.: 13/167,873

(22) Filed: Jun. 24, 2011

(65) Prior Publication Data
US 2011/0249085 A1  Oct. 13, 2011

Related U.S. Application Data

(63) Continuation of application No. PCT/CN2009/073391, filed on Aug. 21, 2009.

(30) Foreign Application Priority Data

Dec. 26, 2008  (CN) .......................... 2008 1 0188926

(51) Int. Cl.
    *H04N 7/15* (2006.01)
(52) U.S. Cl.
    USPC ................... 348/14.08; 348/14.09; 348/14.07
(58) Field of Classification Search
    USPC ...................................... 348/14.08
    See application file for complete search history.

(56) References Cited

U.S. PATENT DOCUMENTS

| 6,593,956 | B1 * | 7/2003 | Potts et al. ................. 348/14.09 |
| 6,731,334 | B1 * | 5/2004 | Maeng et al. ............ 348/211.12 |
| 6,766,035 | B1 * | 7/2004 | Gutta ............................ 382/103 |
| 6,795,106 | B1 * | 9/2004 | Cooper ...................... 348/14.08 |
| 7,113,201 | B1 * | 9/2006 | Taylor et al. ............... 348/14.08 |
| 8,044,990 | B2 * | 10/2011 | Kawaguchi ................ 348/14.09 |
| 8,144,854 | B2 * | 3/2012 | Rodman .................. 379/202.01 |
| 8,169,463 | B2 * | 5/2012 | Enstad et al. ............. 348/14.08 |
| 2001/0055059 | A1 * | 12/2001 | Satoda ....................... 348/14.05 |
| 2002/0140804 | A1 | 10/2002 | Colmenarez et al. |

(Continued)

FOREIGN PATENT DOCUMENTS

| CN | 1460185 | 12/2003 |
| CN | 1479525 | 3/2004 |

(Continued)

OTHER PUBLICATIONS

European Office Action dated Aug. 6, 2012 issued in corresponding European Patent Application No. 09834028.4.

(Continued)

*Primary Examiner* — Davetta W Goins
*Assistant Examiner* — Jasmine Pritchard
(74) *Attorney, Agent, or Firm* — Staas & Halsey LLP (57) ABSTRACT

The embodiments of the present invention disclose a method, device, and system for video communication, and relate to the field of video conference technologies, so as to implement automatic switching of video images during a video conference. The method includes: obtaining video image signals and voice information of a first site; determining video image signals including a video object according to the video image signals and voice information of the first site; and sending the video image signals including the video object to a second site. The method, device, and system provided in the embodiments of the present invention implement automatic switching of video image signals during the video conference, thus avoiding switching errors caused by human factors and improving the efficiency of the conference.

7 Claims, 10 Drawing Sheets

(56) References Cited

U.S. PATENT DOCUMENTS

| | | | |
|---|---|---|---|
| 2002/0175990 A1* | 11/2002 | Martino et al. | 348/14.08 |
| 2003/0090564 A1 | 5/2003 | Strubbe | |
| 2004/0001137 A1 | 1/2004 | Cutler et al. | |
| 2008/0273079 A1* | 11/2008 | Campbell et al. | 348/14.08 |
| 2009/0027483 A1 | 1/2009 | Sakai | |
| 2009/0086013 A1* | 4/2009 | Thapa | 348/14.08 |

FOREIGN PATENT DOCUMENTS

| | | |
|---|---|---|
| CN | 1586074 | 2/2005 |
| CN | 101164339 | 4/2008 |
| CN | 101442654 | 5/2009 |
| EP | 0955765 A1 | 11/1999 |
| EP | 1739966 A1 | 1/2007 |
| WO | 2004/100546 A1 | 11/2004 |

OTHER PUBLICATIONS

Written Opinion of the International Searching Authority, mailed Dec. 3, 2009, in International Application No. PCT/CN2009/073391.

Office Action, mailed Dec. 25, 2009, in Chinese Application No. 200810188926.2.

Office Action, mailed Dec. 21, 2010, in Chinese Application No. 200810188926.2.

International Search Report, mailed Dec. 3, 2009, in corresponding International Application No. PCT/CN2009/073391 (4 pp.).

European Search Report dated Feb. 13, 2012 issued in corresponding European Patent Application No. 09834028.4.

* cited by examiner

METHOD, DEVICE, AND SYSTEM FOR VIDEO COMMUNICATION

CROSS-REFERENCE TO RELATED APPLICATIONS

This application is a continuation of International Application No. PCT/CN2009/073391, filed on Aug. 21, 2009, which claims priority to Chinese Patent Application No. 200810188926.2, filed on Dec. 26, 2008, both of which are hereby incorporated by reference in their entireties.

FIELD OF THE INVENTION

The present invention relates to the field of video conference technologies, and in particular, to a method, device, and system for switching video objects during a video conference.

BACKGROUND OF THE INVENTION

A video conference system enables people in different places to perform remote communication and collaboration face to face. A participant of a site can see participants of other sites through a display screen, and hear the voice of the current speaker at other sites through an audio device, which enables the participant to feel as if all participants are present at a same physical site. At present, many video conference systems display the participants in real size to improve the efficiency and effect of communication between participants at different sites; in this way, the display screen at a site can hardly display all participants at other sites simultaneously.

For example, three participants A1, A2, and A3 are at site A, while display screens of other sites can display only two of them, such as A1 and A2; when A3 needs to speak, it is necessary to enable participants of other sites to see the image of A3 through display screens; in this case, video switching is required.

In the prior art, video switching is implemented during a video conference in the following ways:

(1) A switching button is installed in front of each participant at the site. When a participant needs to speak and participants of other sites need to see the speaker, the speaker can press the switching button, notifying the system to perform video switching, so that the participants of other sites can see the video of the speaker through display screens.

(2) A conference administrator is arranged at each site to perform manual video switching. When it is necessary to switch to the video of the current speaker, the conference administrator judges which participant is speaking through senses such as sight and hearing, and then performs video switching manually, so that participants of other sites can see the video of the current speaker through display screens.

In the process of implementing the video switching during the video conference, the inventor finds at least the following problem in the prior art:

No matter whether the speaker or the conference administrator performs video switching, the switching is a manual process, which tends to interrupt the progress of the conference or cause problems such as video switching errors, thus affecting the efficiency of the conference.

SUMMARY OF THE INVENTION

Embodiments of the present invention provide a method, device, and system for video communication to implement automatic switching of video image signals during a video conference.

To achieve the objective, embodiments of the present invention provide the following technical solution:

A method for video communication includes:
obtaining video image signals and voice information of a first site;
determining video image signals including a video object according to the video image signals and voice information of the first site, where the video object is a current speaker of the first site; and
sending the video image signals including the video object to a second site.

A conference terminal includes a terminal device, and a video presenting device, an audio outputting device, a camera device, and a microphone array that are respectively connected to the terminal device, where the terminal device includes:
an obtaining unit, configured to obtain video image signals and voice information of a first site;
a determining unit, configured to determine video image signals including a video object according to the video image signals and voice information of the first site, where the video object is a current speaker of the first site; and
a sending unit, configured to send the video image signals including the video object to a second site.

A conference managing device includes:
a receiving unit, configured to receive video image signals and voice information of a first site;
a determining unit, configured to determine video image signals including a video object according to the video image signals and voice information of the first site, where the video object is a current speaker of the first site; and
a sending unit, configured to send the video image signals including the video object to a second site.

A video conference system includes a first conference terminal and at least one second conference terminal, where:
the first conference terminal is configured to: obtain video image signals and voice information of a first site, determine video image signals including a video object according to the video image signals and voice information, and send the video image signals including the video object to the second conference terminal;
the at least one second conference terminal is configured to receive the video image signals including the video object from the first conference terminal and display the video image signals including the video object; and
the first site is a site where a current speaker is located and the video object is the current speaker of the first site.

A video conference system includes a first conference terminal, a conference managing device, and at least one second conference terminal, where:
the first conference terminal is configured to collect video image signals and voice information of a first site and send the video image signals and voice information to the conference managing device;
the conference managing device is configured to: receive the video image signals and voice information from the first conference terminal, determine video image signals including a video object according to the video image signals and voice information, and send the video image signals including the video object to the second conference terminal;
the at least one second conference terminal is configured to receive the video image signals including the video object from the conference managing device and display the video image signals including the video object; and
the first site is a site where a current speaker is located and the video object is the current speaker of the first site.

According to the method, device, and system for video communication provided in embodiments of the present invention, it can be automatically judged, according to the video image signals and voice information of the first site, which participant is the current speaker, that is, the video object needed to be displayed in the current video images, and then the current video image signals are switched to the video image signals including the video object for displaying to participants of other sites; compared with the prior art, the method, device, and system for video communication provided in embodiments of the present invention implement automatic switching of video image signals during the video conference, thus avoiding switching errors caused by human factors and improving the efficiency of the conference.

BRIEF DESCRIPTION OF THE DRAWINGS

To make the technical solution of the embodiments of the present invention or in the prior art clearer, accompanying drawings for illustrating the embodiments of the present invention or in the prior art are outlined below. Apparently, the accompanying drawings in the following description are only part of the embodiments of the present invention, and those of ordinary skill in the art can derive other drawings from such accompanying drawings without creative efforts.

DETAILED DESCRIPTION OF THE EMBODIMENTS

The technical solution of the present invention is hereinafter described in detail with reference to the embodiments and accompanying drawings. Apparently, the described embodiments are only part of rather than all of the embodiments of the present invention. All other embodiments, which can be derived by those of ordinary skill in the art from the embodiments described herein without any creative effort, shall fall within the protection scope of the present invention.

The embodiments of the present invention provide a method, device, and system for switching video objects in video communication to implement automatic switching of video images displayed at other sites when the speaker changes at a site during a video conference. The method, device, and system for switching video objects in video communication are detailed below with reference to the exemplary embodiments and accompanying drawings.

During a video conference, the site where the current speaker is located is the first site, and other sites except the first site are the second site. Throughout the specification and claims, the following terms take at least the meanings explicitly associated herein, unless the context clearly dictates otherwise. The meanings identified below are not intended to limit the terms, but merely provide illustrative examples for the terms. The meanings of "a", "an", and "the" include plural references.

Embodiment 1

Figure 1:
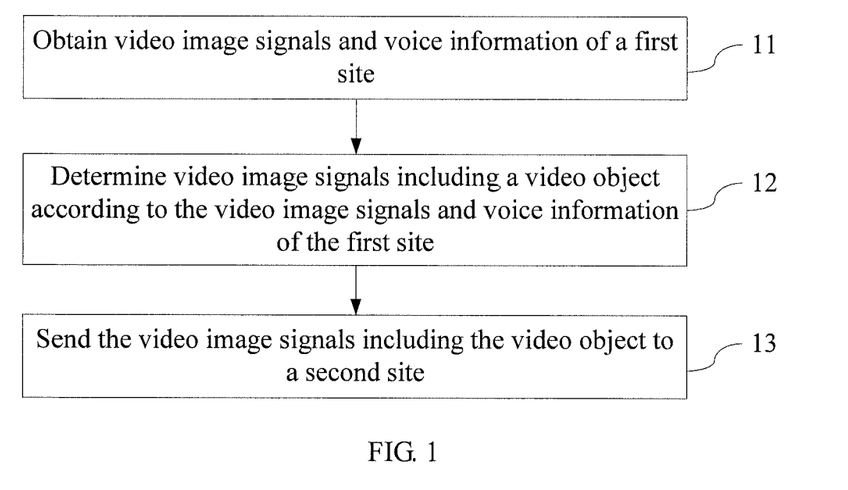
FIG. 1 is a flowchart of a method according to a first embodiment of the present invention.

As shown in FIG. 1, the embodiment of the present invention provides a method for switching video objects in video communication. The method includes the following steps:

11. Obtain video image signals and voice information of the first site.

The video image signals and voice information of the site can be collected through a camera device and a microphone array at the site.

12. Determine, according to the video image signals and voice information of the first site, video image signals including a video object.

The participant who is the current speaker at the first site can be determined and regarded as a video object by using an image identification technology and a microphone array technology according to the obtained video image signals and voice information.

13. Send the video image signals including the video object to the second site.

The step of sending the video image signals including the video object to the second site may be sending the video image signals including the video object to the terminal devices of the second site directly, or may be sending the video image signals including the video object to the terminal devices of multiple second sites through a conference managing device such as a multipoint control unit (MCU).

According to method for switching video objects in video communication provided in this embodiment of the present invention, during the video conference, it can be automatically judged, according to the video image signals and voice information of the first site, which participant is the current speaker, that is, the video object needed to be displayed in the current video images, and then the current video image signals are switched to the video image signals including the video object for displaying to participants of other sites; the method for switching video objects in video communication provided in this embodiment of the present invention implements automatic switching of video image signals during the video conference, thus avoiding switching errors caused by human factors and improving the efficiency of the conference.

Embodiment 2

Suppose that four participants P1, P2, P3, and P4 are at the first site, while the video presenting device of the second site can display only two of them.

Figure 2:
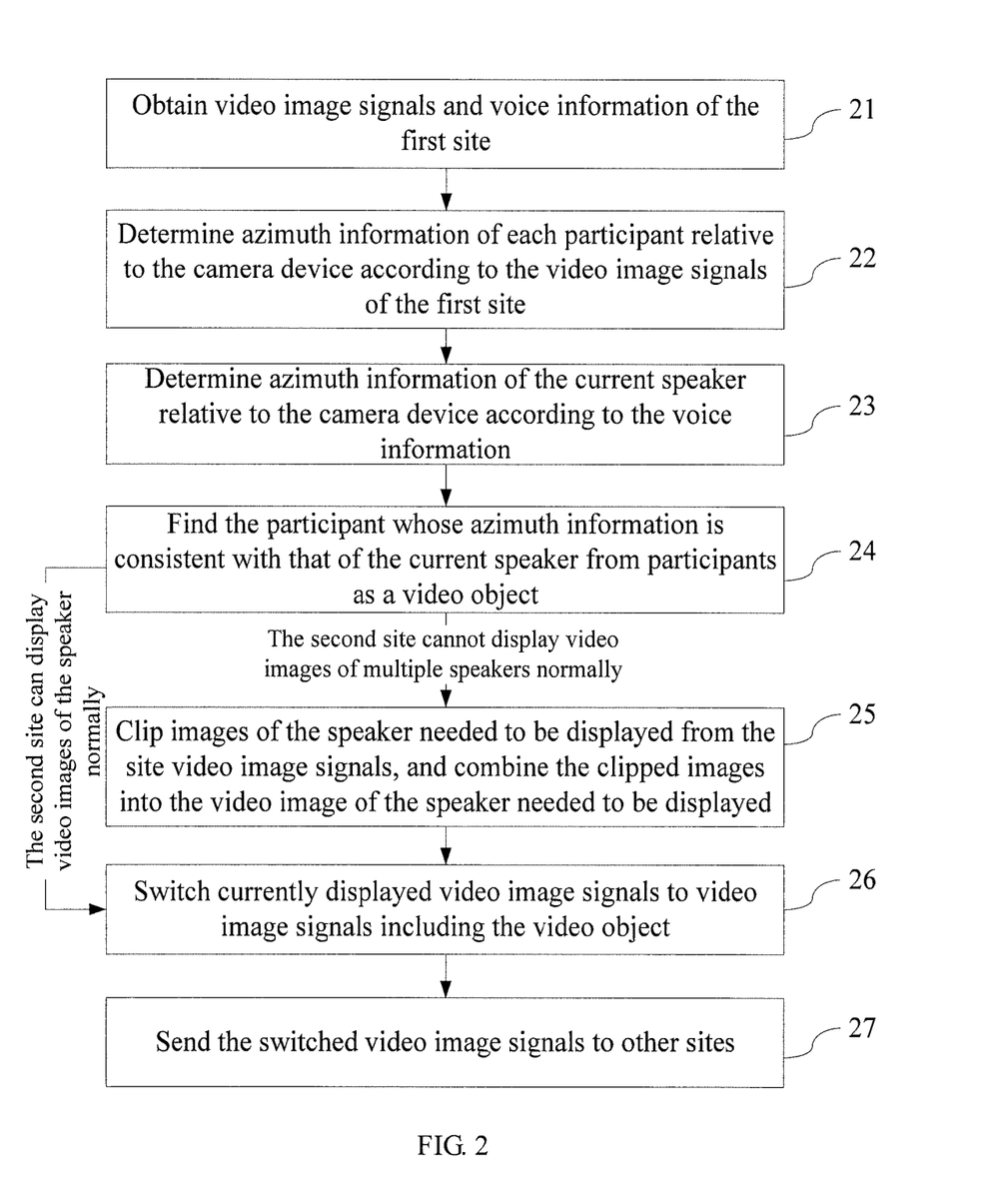
FIG. 2 is a flowchart of a method according to a second embodiment of the present invention.

As shown in FIG. 2, the embodiment of the present invention provides a method for switching video objects in video communication. The method includes the following steps:

21. Obtain video image signals and voice information of the first site.

22. Determine azimuth information of each participant relative to the camera device at the first site according to the video image signals of the first site.

First, images of all participants in the video images obtained from the camera are identified by using an image identification technology.

And then, the azimuths of all participants relative to the camera are calculated according to the imaging principle of the camera. The principle is as shown in FIG. 3.

Figure 3:
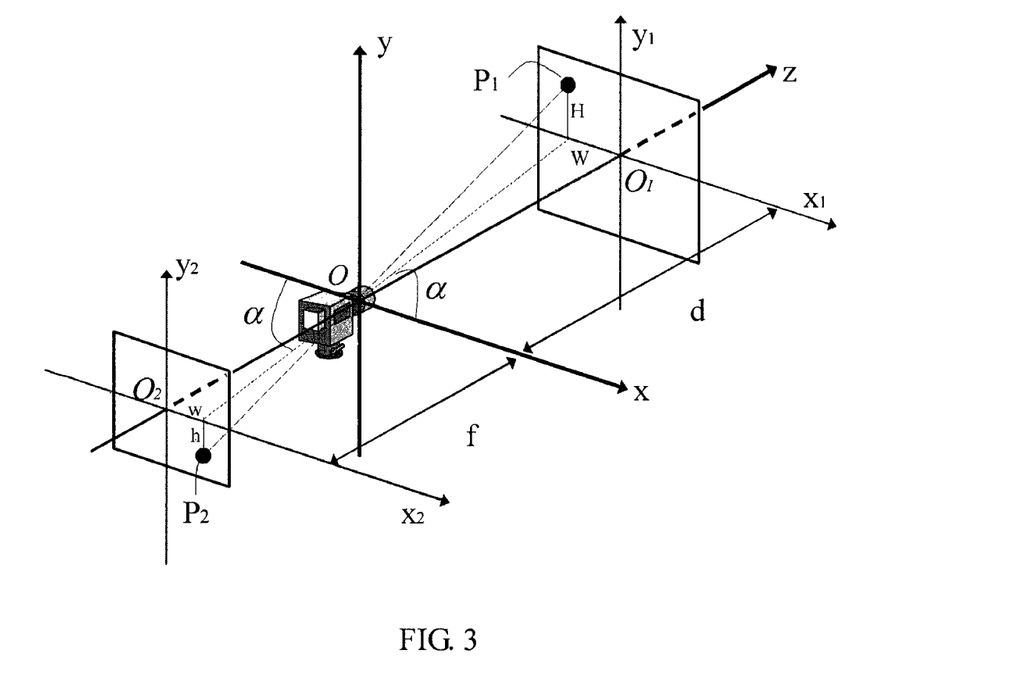
FIG. 3 is a schematic diagram of an imaging principle of a camera.

In FIG. 3, origin O corresponds to the center of the camera lens; axis z corresponds to the center line direction of the camera lens; the plane formed by axis x and axis y is vertical to axis z. The plane where point $O_1$ is located is the plane where point $P_1$ is located and which is vertical to axis z. The distance between point $O_1$ and point O along axis z is the object distance, namely, d. The plane where imaging point $O_2$ is located is the plane where imaging point $P_2$ of $P_1$ is located and which is vertical to axis z. The distance between $O_2$ and O along axis z is the image distance, which is equal to the focal length f of the camera (because the object distance is far greater than the image distance, the image distance is regarded as approximately equal to the focal length f of the camera). According to the image identification technology, we can know that the distance between point $P_2$ and axis $x_2$ is |h| and that the distance between point $P_2$ and axis $y_2$ is |w|. Therefore, we can calculate the azimuth of point $P_1$ relative to the camera according to the coordinates (w, h) of imaging point P2 of point P1 in the $x_2$ $y_2$ coordinate system (in this embodiment of the present invention, azimuth information of the participant relative to the camera is represented by azimuth α).

$$\alpha = \arctan(w/f), 0° < \alpha < 180°$$

Figure 4:
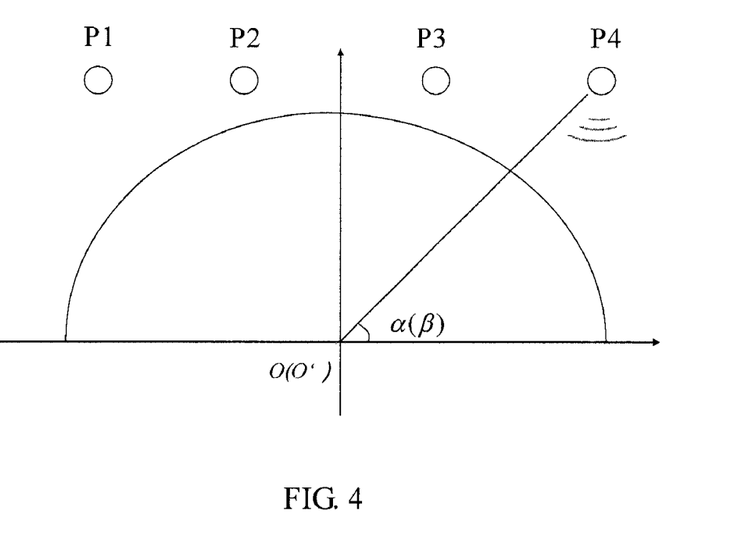
FIG. 4 is a schematic diagram of a first coordinate system used by a site.

As shown in FIG. 4, the angle of participant P4 relative to the camera is α, which is the azimuth information of the participant relative to the camera.

23. Determine azimuth information of the current speaker relative to the camera device according to the voice information.

At the site, a microphone array is set between the video presenting device and the participant. The microphone array may be but not limited to a linear array, a round array, or a cross-shaped array that includes at least two microphones, or may be a microphone array of other forms.

Because the position of each microphone in the microphone array varies, the distance between the sound from a sound source and each microphone is also different. Therefore, we can detect the delay between audio signals recorded by each microphone, and estimate the azimuth of the current speaker relative to the microphone array according to the delay between audio signals and the position of the microphone in the microphone array.

The azimuth of the current speaker, namely, the video object needed to be displayed, relative to the camera can be calculated by using the foregoing microphone array technology and according to the position relationship between the microphone array and the camera.

If the horizontal coordinate system (referred to as a camera coordinate system) used to determine the azimuth of the participant through the video image signals obtained by the camera coincides with the horizontal coordinate system (referred to as a microphone array coordinate system) used to calculate the azimuth of the current speaker through the microphone array, as shown in FIG. 4, the center (point O) of the camera lens also coincides with the center (point O') of the microphone array. Therefore, azimuth information (angle β) of the current speaker relative to the microphone array obtained by using the microphone array technology is the azimuth information (angle α) of the current speaker relative to the camera, that is, α=β.

Figure 5:
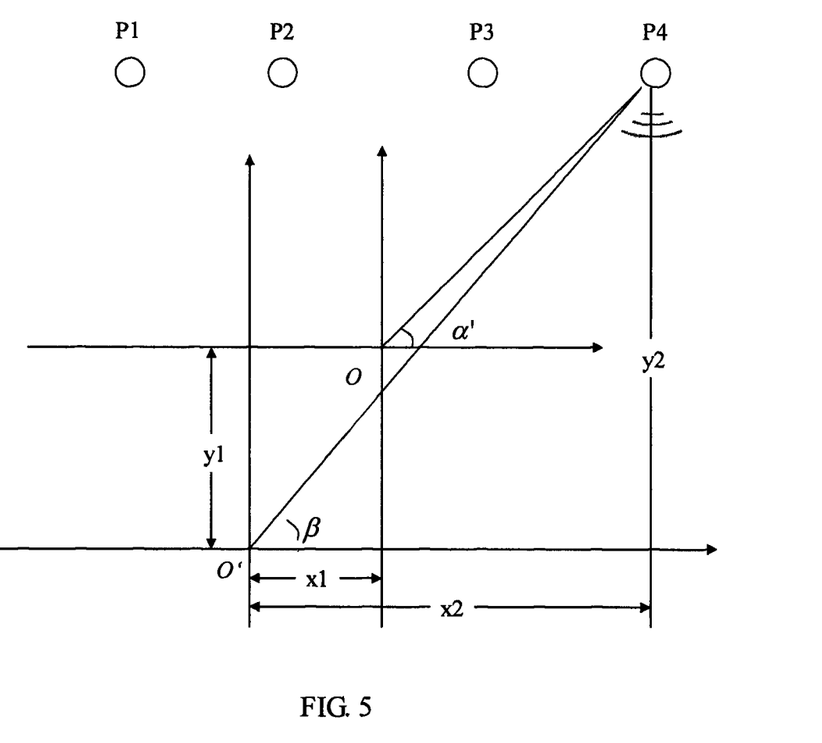
FIG. 5 is a schematic diagram of a second coordinate system used by a site.

If the camera coordinate system does not coincide with the microphone array coordinate system, the two coordinate systems need to be unified. For example, the camera coordinate system can be unified to the microphone array coordinate system, or the microphone array coordinate system can be unified to the camera coordinate system. As shown in FIG. 5, origin O of the camera coordinate system does not coincide with origin O' of the microphone array coordinate system, but the position relationship between origin O and origin O' is known, that is, x1 and y1 are known, and the distance (x2 and y2) between the current speaker and the origin O' can also be obtained by using the microphone array technology. Therefore, we can easily obtain azimuth information α' of the current speaker relative to origin O (the center of the camera lens) according to x1, y1, x2, and y2:

$$\alpha' = \arctan\left(\frac{y2 - y1}{x2 - x1}\right), 0° < \alpha' < 180°$$

24. Find the participant whose azimuth information is consistent with that of the current speaker from participants as a video object.

Theoretically, azimuth α of the current video object relative to the camera is the same as the azimuth information β (or α') of the current speaker relative to the camera. Therefore, we can compare azimuth information of different participants relative to the camera with azimuth information β (or α') of the current speaker relative to the camera. The participant whose azimuth information relative to the camera is the same as the azimuth information β (or α') of the current speaker is the current video object. In the actual situation, due to the existence of errors, α and β (or α') can hardly be completely equal. In this case, the participant with a smallest absolute difference between the azimuth information relative to the camera and β (or α') is the current video object, where the absolute difference is an absolute value of the difference between two angles.

If only one speaker or two adjacent speakers are currently present among participants, the second site can display the video image of the speaker normally, and step 26 is performed; if non-adjacent speakers or multiple speakers are currently present among participants, and the second site cannot display video images of the foregoing multiple speakers simultaneously, the video images need to be processed firstly, and step 25 is performed.

25. Clip images of the speaker needed to be displayed from the site video image signals, and combine the clipped images into the video image including the speaker needed to be displayed.

Figure 6:
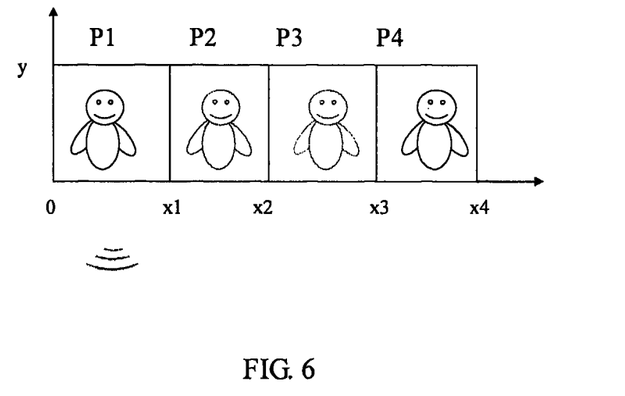
FIG. 6 is a first schematic diagram of the position of a speaker at a first site according to the second embodiment of the present invention.

As shown in FIG. 6, after image identification, the video image signals of the first site are divided into four parts: P1, P2, P3, and P4. The areas corresponding to the four parts are as shown in Table 1 (where all units are pixels).

TABLE 1

| Participant | Lower-Left Coordinate of the Area | Upper-Right Coordinate of the Area |
|---|---|---|
| P1 | (0, 0) | (x1 − 1, y) |
| P2 | (x1, 0) | (x2 − 1, y) |
| P3 | (x2, 0) | (x3 − 1, y) |
| P4 | (x3, 0) | (x4 − 1, y) |

If the system detects that participant P1 at the first site is speaking for a long time (as shown in FIG. 6), while the video image of the first site seen by participants at the second site does not include the image of P1, for example, the video image includes P2 and P3, the image needs to be switched to the image including P1. If the video presenting device of the second site can display two persons at each site, a participant adjacent to P1 can be selected for displaying. For example, four participants are present at the first site of this embodiment, and therefore, the image including P1 and P2 can be displayed at the second site.

If two adjacent speakers are present at the first site, the process of determining the range of the video image signals needed to be switched is similar to the process of displaying P1 and P2 images simultaneously, and is not repeatedly described here.

However, in the following cases, the video image needs to be processed first, and then the range of the video image signals needed to be switched can be determined.

Figure 7:
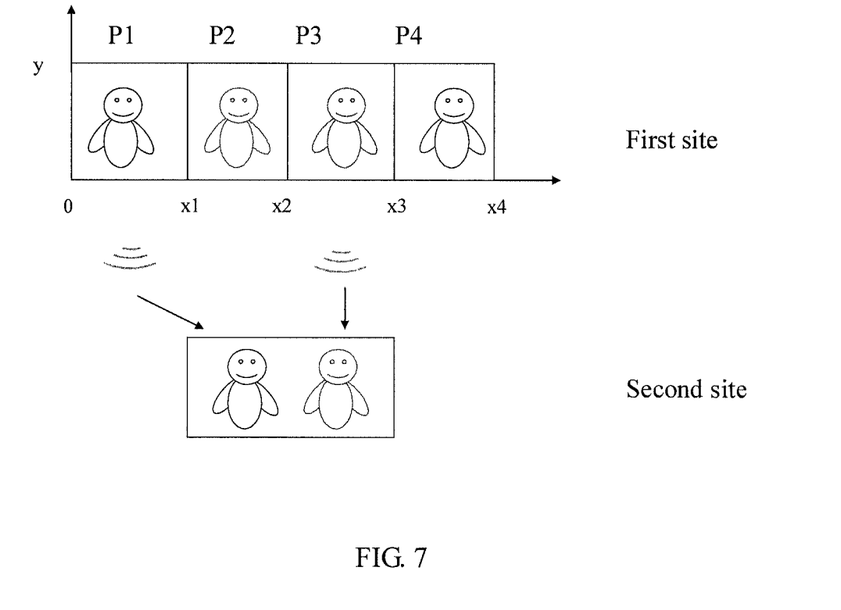
FIG. 7 is a second schematic diagram of the position of a speaker at the first site according to the second embodiment of the present invention.

(1) If multiple speakers are detected (as shown in FIG. 7), and the number of speakers is not greater than the number of persons that can be displayed by the video presenting device of the second site, for example, the main speakers at the first site are P1 and P3, the image of P1 and P3 can be clipped from the corresponding video image of the first site, and then recombined and stitched into a new video image signal for displaying by the video presenting device of the second site.

Figure 8:
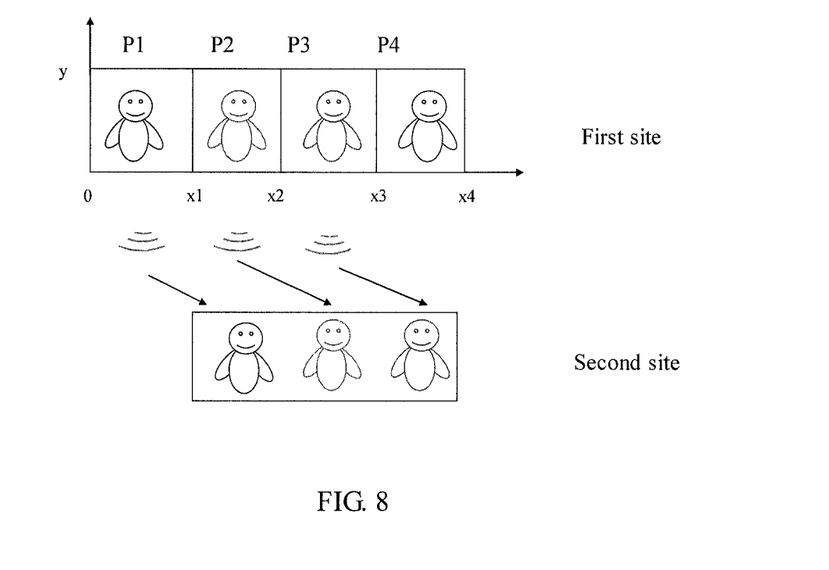
FIG. 8 is a third schematic diagram of the position of a speaker at the first site according to the second embodiment of the present invention.

(2) In a collaborative video conference, the following case may occur: only several participants speak, and the number of speakers exceeds the number of persons that can be displayed by the video presenting device of the second site. As shown in FIG. 8, P1, P2, and P3 are main speakers. If the video presenting device of the second site can display three persons of the same site, P1, P2, and P3 can be selected for displaying at the second site (as shown in FIG. 8); however, the actual case is more similar to the case set in this embodiment of the present invention, that is, only two persons of a site can be displayed simultaneously at the second site; in this case, the areas to be displayed are determined in units of areas. For example, P1, P2, and P3 are all speaking, while only two of them can be displayed at the second site, which requires that an area should be selected from the area including P1 and P2 and the area including P2 and P3 as the video image area for switching; in this case, we can select the area combination with more voice signal energy for displaying by comparing voice signal energy of the two area combinations.

Figure 9:
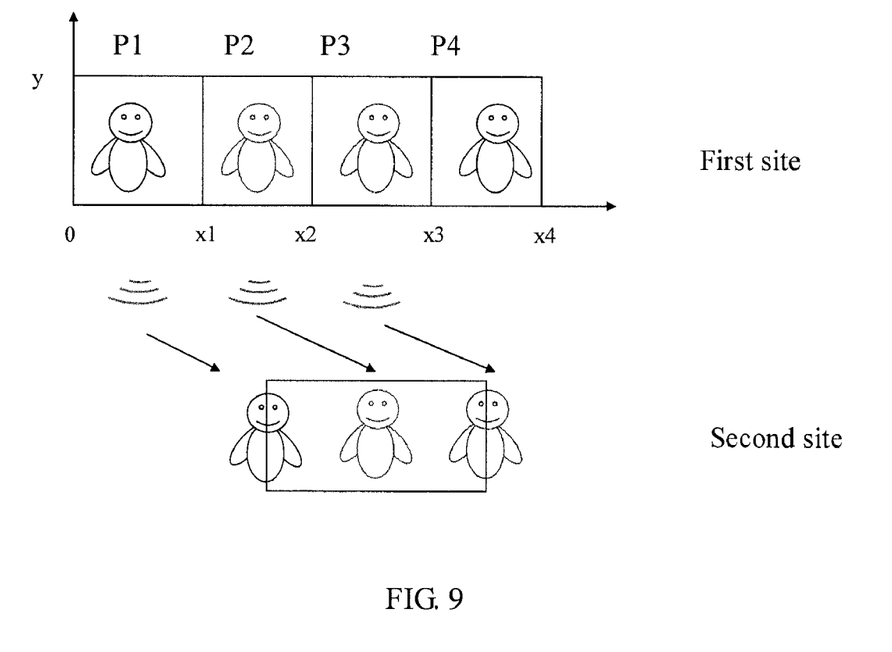
FIG. 9 is a fourth schematic diagram of the position of a speaker at the first site according to the second embodiment of the present invention.
Figure 10:
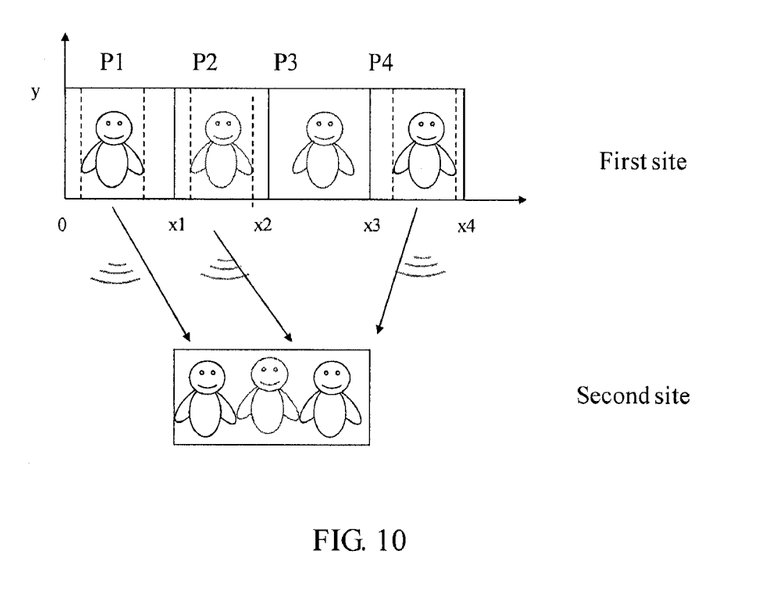
FIG. 10 is a fifth schematic diagram of the position of a speaker at the first site according to the second embodiment of the present invention.

In the case that P1, P2, and P3 are all speaking, another solution is: The center position of the three speakers is calculated according to the site video image signals, and the center position is used as the display center of the video image needed to be switched for the purpose of displaying the video image in the video presenting device of the second site (as shown in FIG. 9). However, this solution will cause the clipping of some images of P1 and P3; in this case, because a blank area exists among P1, P2, and P3, the blank area can be clipped so that images of all speakers can be displayed in the video presenting device of the second site, as shown in FIG. 10.

26. Switch the video image signals currently displayed to video image signals including the video object.

After a participant is judged as a video object, if the video object needed to be displayed does not appear in the video images displayed at the second site, the video image currently displayed needs to be switched to the video image including the video object.

27. Send the switched video image signals including the video object to other sites.

The step of sending the switched video image signals including the video object to other sites may be sending the switched video image signals including the video object to the terminal devices of the second site directly, or sending the switched video image signals including the video object to the terminal devices of multiple second sites through a conference managing device such as an MCU.

The video presenting device of the second site can display only video images of some participants at the first site; therefore, at the time of sending the video image signals including the video object to the second site, the panoramic video image signals of the first site at a low bit rate are sent together as auxiliary video signals to the second site and displayed. In this way, the participants of the second site can know the situation of the first site more visually, and do not feel an abrupt change during video switching.

Step numbers provided in this embodiment do not limit the sequence of steps. For example, step 22 and step 23 may occur simultaneously and are performed in real time.

According to the method for switching video objects in video communication provided in this embodiment of the present invention, it can be automatically judged, according to the extent of matching between azimuth information of each participant relative to the camera and azimuth information of the current speaker relative to the camera, which participant is the current speaker, that is, the video object needed to be displayed in the current video images, and then the currently displayed video image signals are switched to the video image signals including the video object for displaying to participants of other sites; in view of the case that the video presenting device of the second site cannot display all speakers normally when multiple speakers are present at the first site, displaying multiple speakers of a site simultaneously at the second site is implemented by clipping and stitching video images; the method for switching video objects in video communication implements automatic switching of video image signals during the video conference, thus avoiding switching errors caused by human factors and improving the efficiency of the conference.

Embodiment 3

To better implement the foregoing method for switching video objects in video communication, this embodiment of the present invention provides a conference terminal used in a video conference; the conference terminal is described in detail below with reference to accompanying drawings.

Figure 11:
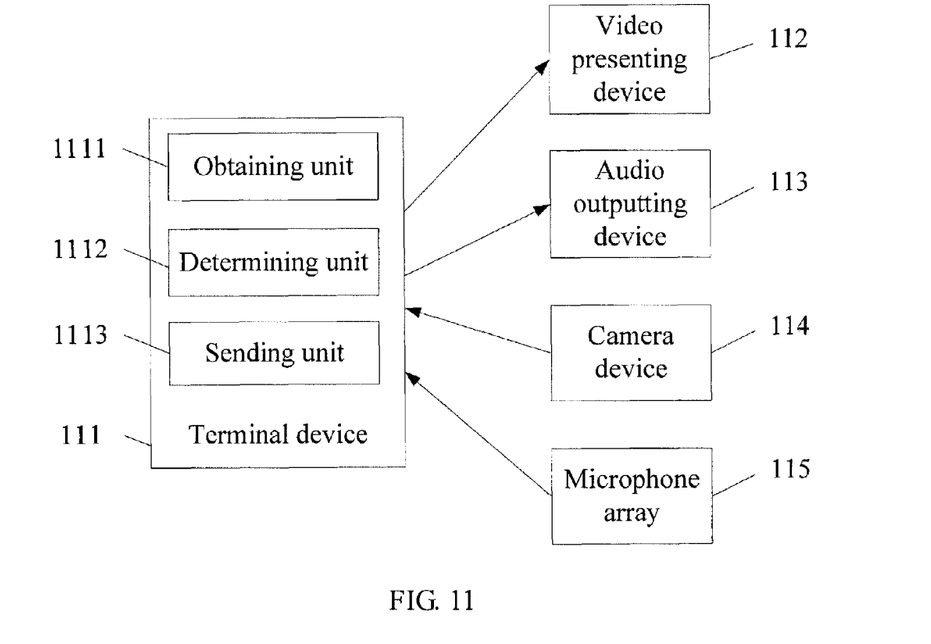
FIG. 11 is a schematic structural diagram of a conference terminal according to a third embodiment of the present invention.

As shown in FIG. 11, the conference terminal provided in this embodiment of the present invention includes a terminal device 111, and a video presenting device 112, an audio outputting device 113, a camera device 114, and a microphone array 115 that are respectively connected to the terminal device 111, where the terminal device 111 further includes: an obtaining unit 1111, a determining unit 1112, and a sending unit 1113.

The obtaining unit 1111 obtains video image signals and voice information of a site through the camera device 114 and the microphone array 115; and then the determining unit 1112 determines the video image signals including a video object according to the site video image signals and voice information, where the video object is the current speaker of the site; finally, the sending unit 1113 sends the video image signals including the video object to a second site.

Figure 12:
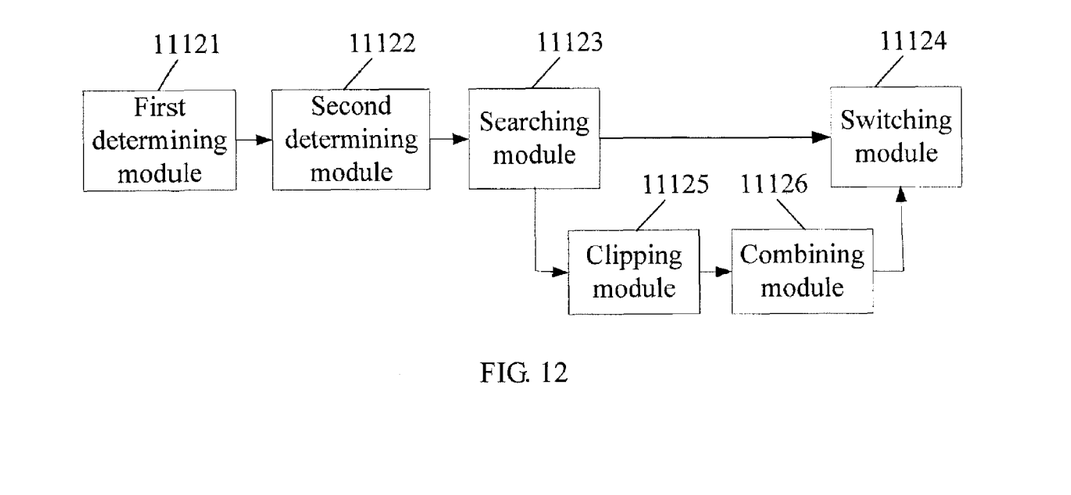
FIG. 12 is a schematic diagram of a determining unit in a conference terminal device according to the third embodiment of the present invention.

The determining unit 1112 can determine which participant at the site is the current speaker by using an image identification technology and a microphone array technology according to the obtained site video image signals and voice information, and use the current speaker as the video object. As shown in FIG. 12, the determining unit 1112 further includes: a first determining module 11121, a second determining module 11122, a searching module 11123, and a switching module 11124.

The first determining module 11121 determines azimuth information of each participant relative to the camera device according to the image identification technology and the imaging principle of the camera and the site video image signals.

The second determining module 11122 determines azimuth information of the current speaker relative to the camera device according to the microphone array technology and the voice information.

Generally, the azimuth information obtained according to the voice information is azimuth information of the current speaker relative to the microphone array; if the center of the camera lens coincides with the center of the microphone array at the current site, the azimuth information of the current speaker relative to the microphone array is the azimuth information of the current speaker relative to the camera device; if the center of the camera lens does not coincide with the center of the microphone array, the azimuth information of the current speaker relative to the camera device is obtained by converting the azimuth information of the current speaker relative to the microphone array.

And then the searching module 11123 finds the participant whose azimuth information is consistent with that of the current speaker from participants as a video object. Consistency with the azimuth information of the current speaker is specifically: being the same as the azimuth information of the current speaker, or having the smallest absolute difference from the azimuth of the current speaker in azimuth information of all participants.

Finally, the switching module 11124 switches the video image signals currently displayed to video image signals including the video object.

If at least two video objects are present at the first site, and the video presenting device cannot display the at least two video objects simultaneously, the determining unit 1112 further includes:

a clipping module 11125, configured to clip image signals corresponding to the video objects needed to be displayed from the site video image signals; and a combining module 11126, configured to combine the clipped image signals into video image signals including the video objects needed to be displayed, and send the combined video image signals to the switching module 11124.

If the number of the second sites is equal to or greater than 2, a conference managing device is required to forward the switched video image signals; in this case, the sending unit 1113 sends the switched video image signals including video objects to the conference managing device, and then the conference managing device forwards the signals to the second sites. To enable participants at the second sites to see the situation of the first site more visually, the sending unit 1113 is further configured to send panoramic site video image signals at a low bit rate with the video image signals including video objects to the second sites.

With the conference terminal provided in this embodiment of the present invention, it can be automatically judged, according to the extent of matching between the azimuth of each participant and the azimuth of the current speaker, which participant is the current speaker, that is, the video object needed to be displayed in the current video images, and then the currently displayed video image signals are switched to the video image signals including the video object for displaying to participants of other sites; the conference terminal provided in this embodiment of the present invention implements automatic switching of video image signals during the video conference, thus avoiding switching errors caused by human factors and improving the efficiency of the conference.

Embodiment 4

To better implement the foregoing method for switching video objects in video communication, this embodiment of the present invention provides a conference managing device used in a video conference; the conference managing device is described in detail below with reference to accompanying drawings.

Figure 13:
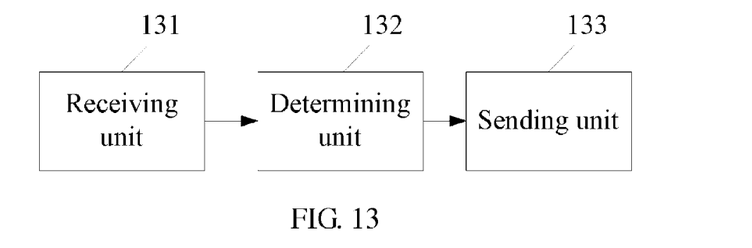
FIG. 13 is a schematic structural diagram of a conference managing device according to a fourth embodiment of the present invention.

As shown in FIG. 13, the conference managing device provided in this embodiment of the present invention includes a receiving unit 131, a determining unit 132, and a sending unit 133.

The receiving unit 131 receives the video image signals and voice information of a first site, and then the determining unit 132 determines video image signals including a video object according to the site video image signals and voice information, where the video object is the current speaker of the site; finally, the sending unit 133 sends the video image signals including the video object to a second site; here the second site is other sites except the site where the current speaker is located.

Figure 14:
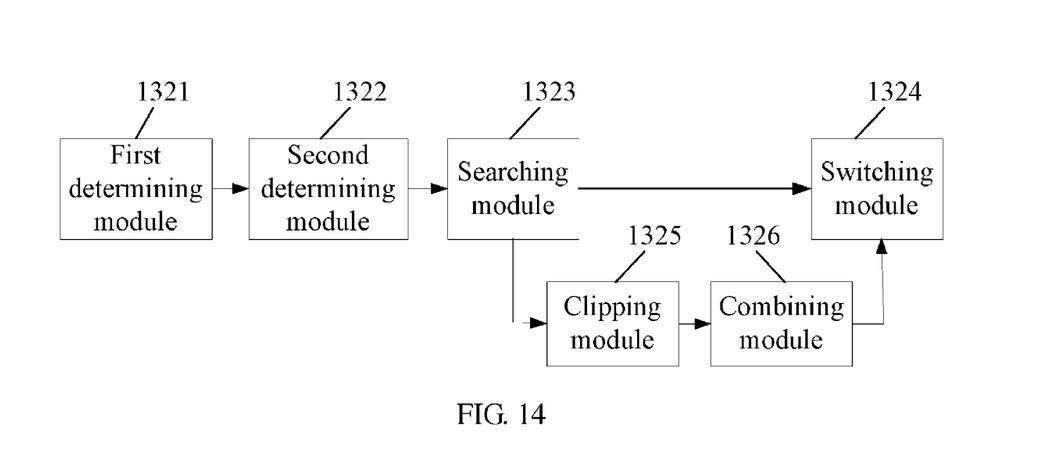
FIG. 14 is a schematic diagram of a determining unit in a conference managing device according to the fourth embodiment of the present invention.

The determining unit 132 can determine which participant at the site is the current speaker by using an image identification technology and a microphone array technology according to the obtained site video image signals and voice information, and use the current speaker as the video object. As shown in FIG. 14, the determining unit 132 further includes: a first determining module 1321, a second determining module 1322, a searching module 1323, and a switching module 1324.

The first determining module 1321 determines azimuth information of each participant relative to the camera device according to the image identification technology and the imaging principle of the camera and the site video image signals.

The second determining module 1322 determines azimuth information of the current speaker relative to the camera device according to the microphone array technology and the voice information.

Generally, the azimuth information obtained according to the voice information is azimuth information of the current speaker relative to the microphone array; if the center of the camera lens coincides with the center of the microphone array at the current site, the azimuth information of the current speaker relative to the microphone array is the azimuth information of the current speaker relative to the camera device; if the center of the camera lens does not coincide with the center of the microphone array, the azimuth information of the current speaker relative to the camera device is obtained by converting the azimuth information of the current speaker relative to the microphone array.

And then the searching module 1323 finds the participant whose azimuth information is consistent with that of the current speaker from participants as a video object. Consistency with the azimuth information of the current speaker is specifically: being the same as the azimuth information of the current speaker, or having the smallest absolute difference from the azimuth of the current speaker in azimuth information of all participants.

Finally, the switching module 1324 switches the video image signals currently displayed to video image signals including the video object.

If at least two video objects are present at the first site, and the video presenting device cannot display the at least two video objects simultaneously, the determining unit 132 further includes:

a clipping module 1325, configured to clip image signals corresponding to the video objects needed to be displayed from the site video image signals; and a combining module 1326, configured to combine the clipped image signals into video image signals including the video objects needed to be displayed, and send the combined video image signals to the switching module.

To enable participants at the second sites to see the situation of the first site more visually, the sending unit 133 further sends panoramic site video image signals at a low bit rate with the video image signals including video objects to the second sites.

With the conference managing device provided in this embodiment of the present invention, it can be automatically judged, according to the extent of matching between the azimuth of each participant and the azimuth of the current speaker, which participant is the current speaker, that is, the video object needed to be displayed in the current video images, and then the currently displayed video image signals are switched to the video image signals including the video object for displaying to participants of other sites; the conference managing device provided in this embodiment of the present invention implements automatic switching of video image signals during the video conference, thus avoiding switching errors caused by human factors and improving the efficiency of the conference.

Embodiment 5

Figure 15:
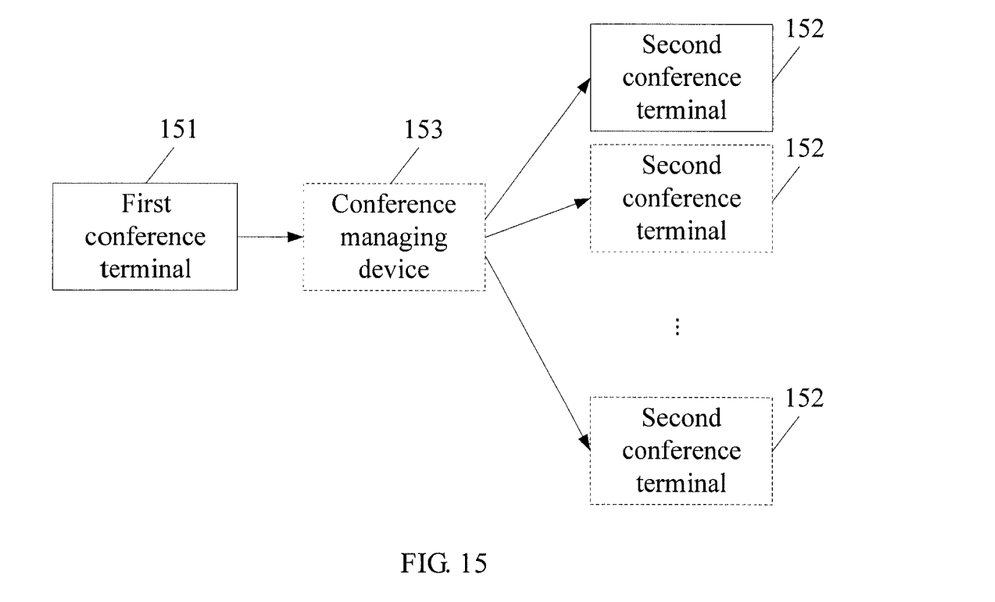
FIG. 15 is a schematic structural diagram of a system according to a fifth embodiment of the present invention.

An embodiment of the present invention also provides a video conference system that can implement the foregoing method for switching video objects in video communication. As shown in FIG. 15, the video conference system includes: a first conference terminal 151 and at least one second conference terminal 152.

The first conference terminal 151 obtains video image signals and voice information of a first site, determines video image signals including a video object according to the site video image signals and voice information, where the video object is the current speaker of the first site, and sends the video image signals including the video object to the second conference terminal.

The at least one second conference terminal 152 receives the video image signals including the video object from the first conference terminal and displays the video image signals including the video object.

The first site is the site where the current speaker is located.

If the number of the second conference terminals is equal to or greater than 2, the video conference system in this embodiment of the present invention further requires a conference managing device 153, which is configured to obtain the video image signals including the video object from the first conference terminal and send the video image signals to the second conference terminal.

With the video conference system provided in this embodiment of the present invention, the first conference terminal can automatically judge which participant is the current speaker (that is, the video object needed to be displayed in the current video images) during the video conference according to the video image signals and voice information of the first site, and then switch the currently displayed video image signals to the video image signals including the video object and send the video image signals including the video object to the second conference terminal for displaying to participants of the second site; the video conference system provided in this embodiment of the present invention implements automatic switching of video image signals during the video conference, thus avoiding switching errors caused by human factors and improving the efficiency of the conference.

Embodiment 6

Figure 16:
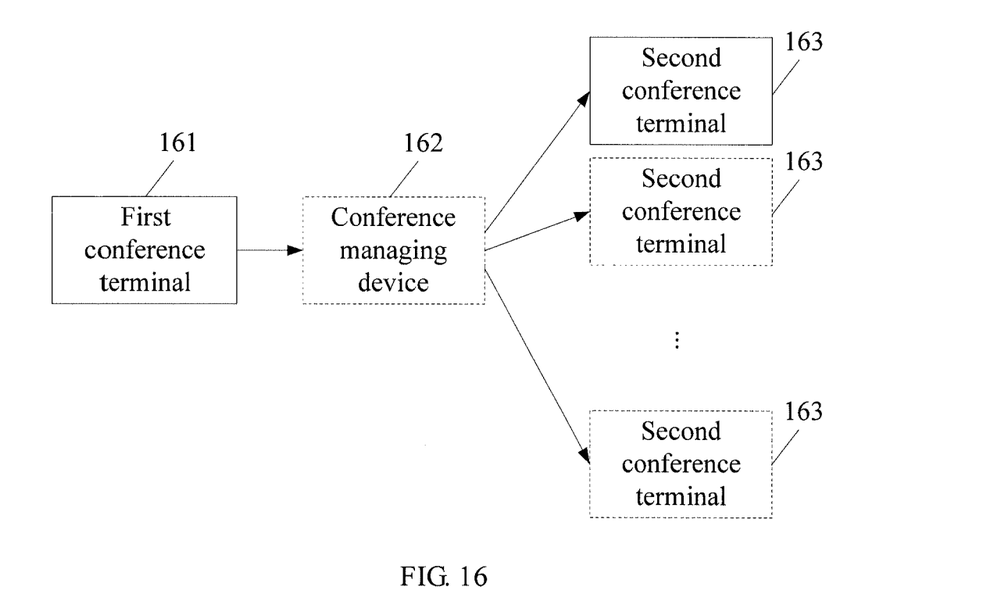
FIG. 16 is a schematic structural diagram of a system according to a sixth embodiment of the present invention.

An embodiment of the present invention also provides a video conference system that can implement the foregoing method for switching video objects in video communication. As shown in FIG. 16, the video conference system includes: a first conference terminal 161, a conference managing device 162, and at least one second conference terminal 163.

The first conference terminal 161 collects video image signals and voice information of a first site and sends the site video image signals and voice information to the conference managing device 162.

The conference managing device 162 receives the site video image signals and voice information sent by the first conference terminal 161, determines video image signals including a video object according to the site video image signals and voice information, where the video object is the current speaker of the first site, and sends the video image signals including the video object to the second conference terminal 163.

The at least one second conference terminal 163 receives the video image signals including the video object from the conference managing device 162 and displays the video image signals including the video object.

The first site is the site where the current speaker is located.

Figure 17:
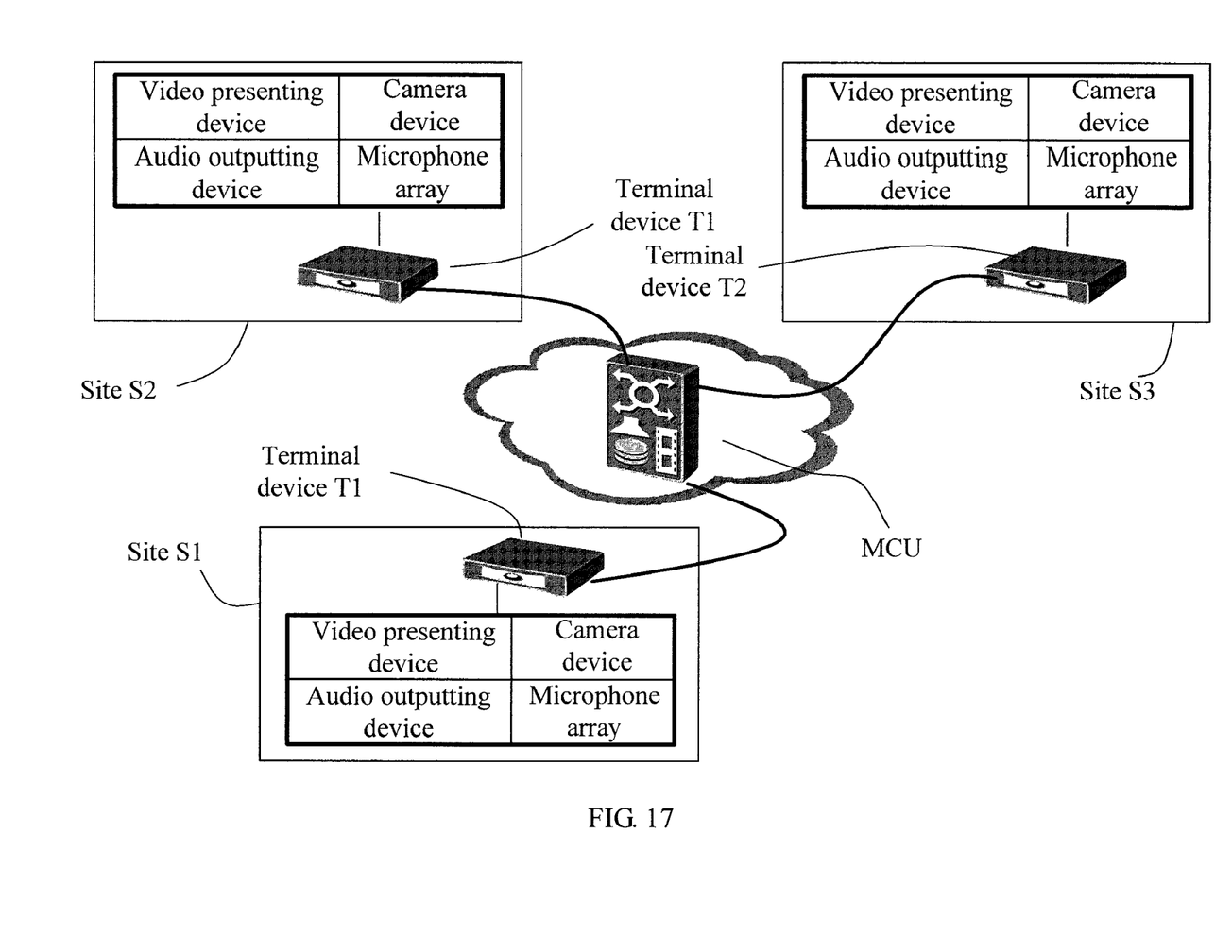
FIG. 17 is a schematic diagram of a system instance according to the sixth embodiment of the present invention.

FIG. 17 is an embodiment of a specific application of the present invention. The conference managing device is an MCU.

When a video conference is ongoing, the MCU simultaneously receives the site video image signals and voice information provided by conference terminals of sites S1, S2, and S3, and then judges which site is the first site according to the site video image signals and voice information of each site; if S1 is the first site, the MCU determines the video image signals including a video object according to the site video image signals and voice information of S1, and sends the signals to the conference terminals of S2 and S3 for displaying at the second site.

In the video conference system provided in embodiments of the present invention, the first conference terminal collects video image signals and voice information of the first site and sends them to the conference managing device; and then the conference managing device automatically judges which participant is the current speaker (that is, the video object needed to be displayed in current video images) according to the video image signals and voice information of the first site, and then switches the currently displayed video image signals to the video image signals including the video object and sends the video image signals including the video object to the second conference terminal for displaying to participants of the second site; the video conference system provided in embodiments of the present invention implements automatic switching of video image signals during the video conference, thus avoiding switching errors caused by human factors and improving the efficiency of the conference.

It is understandable to those of ordinary skill in the art that all or part of the steps of the foregoing embodiments can be implemented by hardware instructed by a program. The program may be stored in a computer readable storage medium. When the program is executed, the steps of the methods in the foregoing embodiments are executed. The storage medium may be any medium that can store program codes, such as a read only memory (ROM), a random access memory (RAM), a magnetic disk and a compact disk-read only memory (CD-ROM).

Although the invention has been described through some exemplary embodiments, the invention is not limited to such embodiments. It is apparent that those skilled in the art can make various modifications and substitutions to the invention without departing from the spirit and scope of the invention. Therefore, the scope of the present invention is subject to the appended claims.

What is claimed is:

1. A method for video communication, comprising:
   obtaining video image signals and voice information of a first site;
   determining azimuth information of a conference participant relative to a camera device at the first site according to the video image signals for the first site;
   determining azimuth information of conference participant speakers relative to the camera device at the first site according to the voice information;
   finding participants whose azimuth information are consistent with that of the conference participant speakers from the conference participants as video objects, wherein a video object is of a conference participant speaker at the first site;
   when the video objects are not displayable simultaneously by a video presenting device of a second site, clipping image signals corresponding to the video objects needed to be displayed at the second site from the video image signals for the first site, and combining the clipped image signals into video image signals comprising the video objects; and
   sending combined video image signals comprising the video objects to the video presenting device of a second site for playback.

2. The method of claim 1, wherein consistency with the azimuth information of the current speaker comprises:
   being the same as the azimuth information of the current speaker relative to the camera device; or
   having a smallest absolute difference from an azimuth of the current speaker in azimuth information of all participants.

3. The method of claim 1, wherein the sending combined video image signals comprising the video objects to the second site comprises:
   sending the combined video image signals comprising the video objects to the second site through a conference managing device; or
   sending the combined video image signals comprising the video objects to the second site directly.

4. A conference terminal, comprising:
   a terminal device, and a video presenting device, an audio outputting device, a camera device, and a microphone array that are respectively connected to the terminal device, wherein the terminal device comprises:
   an obtaining unit, configured to obtain video image signals and voice information of a first site;
   a determining unit, wherein the determining unit comprises:
   a first determining module, configured to determine azimuth information of a conference participant relative to a camera device at the first site according to the video image signals for the first site;
   a second determining module, configured to determine azimuth information of conference participant speakers relative to the camera device at the first site according to the voice information;
   a searching module, configured to find participants whose azimuth information are consistent with that of the conference speakers from the conference participants as video objects, wherein a video object is of a conference speaker at the first site;
   when the video presenting device of a second site cannot display the video objects simultaneously,
   a clipping module, configured to clip image signals corresponding to the video objects needed to be displayed at the second site from the video image signals for the first site;
   a combining module, configured to combine the clipped image signals into video image signals comprising the video objects;
   a sending unit, configured to send combined video image signals comprising the video objects to a second site for playback.

5. A video conference system, comprising a first conference terminal and a second conference terminal, wherein:
   the first conference terminal is configured to:
   obtain video image signals and voice information of a first site, determine azimuth information of a conference participant relative to a camera device at the first site according to the video image signals for the first site, determine azimuth information of conference participant speakers relative to the camera device at the first site according to the voice information, find conference participants whose azimuth information are consistent with that of the conference participant speakers from the conference participants as video objects, wherein a video object is of a conference participant speaker at the first site;
   when a video presenting device of second conference terminal in a second site cannot display the video objects simultaneously, the first conference terminal is further configured to: clip image signals corresponding to the video objects needed to be displayed at the second site from the video image signals for the first site, combine the clipped image signals into video image signals comprising the video objects, and sending combined video image signals comprising the video objects to a second site for playback;

the second conference terminal is configured to receive the combined video image signals comprising the video objects from the first conference terminal and display the combined video image signals on the video presenting device; and the first site is a site wherein a current conference participant speaker is located and the video objects are the current conference participant speakers of the first site.

6. The method of claim 1, wherein the clipping of image signals corresponding to the video objects needed to be displayed from the video image signals for the first site, comprises:

deleting blank area that exists among video objects;

clipping image signals corresponding to each video object so as to display every conference participant speaker in the video presenting device of the second site.

7. The method of claim 1, wherein the clipping of image signals corresponding to the video objects needed to be displayed from the video image signals for the first site, comprises:

dividing the video objects into at least two areas;

clipping image signals corresponding to at least one area needed to be displayed from the video image signals of the first site.

* * * * *